_United States Patent Office_ 3,215,754
Patented Nov. 2, 1965

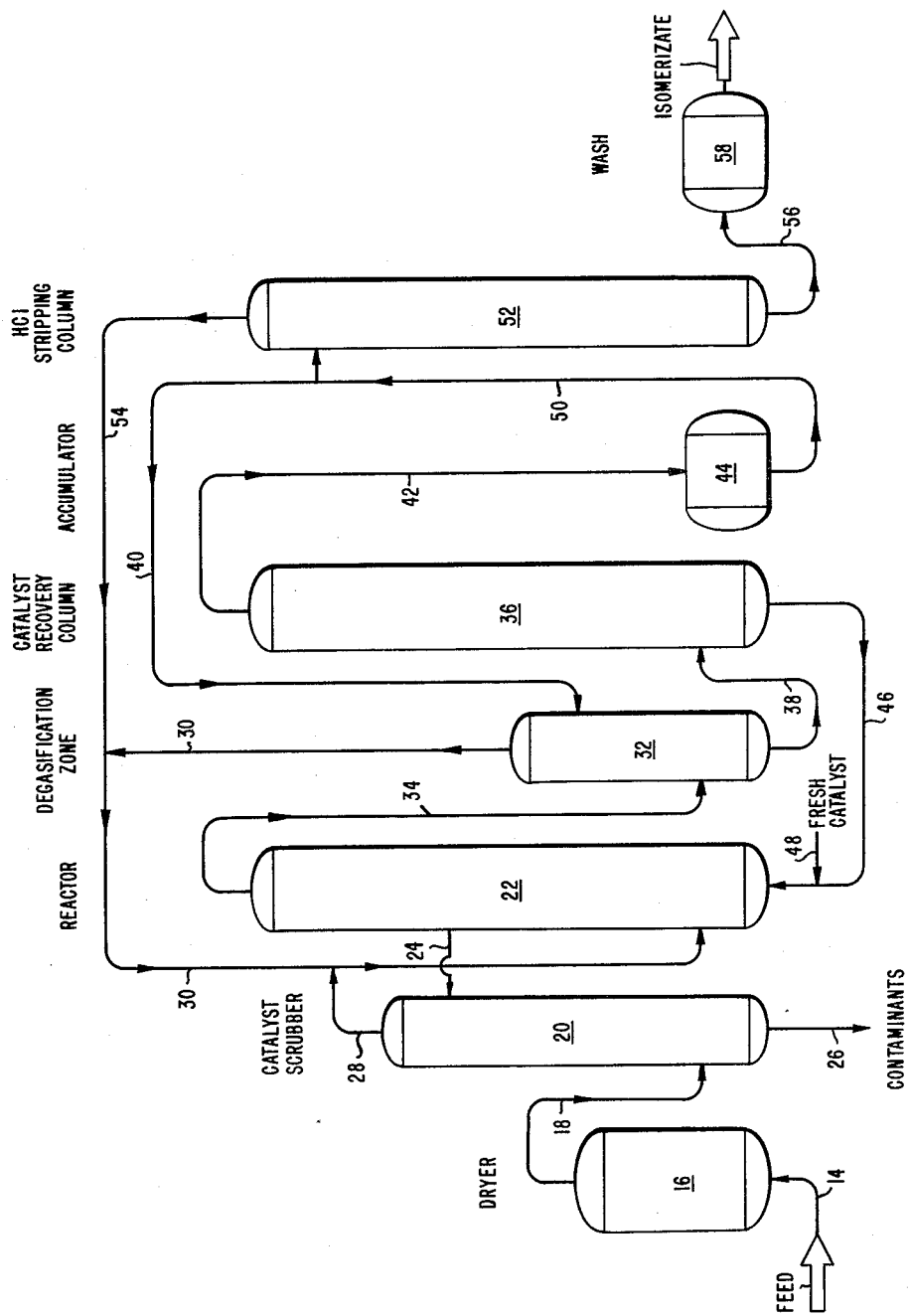

3,215,754
CATALYST RECOVERY IN MOLTEN SALT ISOMERIZATION PROCESS
Harry D. Evans, Oakland, and William S. Reveal, Orinda, Calif., assignors to Shell Oil Company, New York, N.Y., a corporation of Delaware
Filed Dec. 18, 1962, Ser. No. 245,597
4 Claims. (Cl. 260—683.75)

This invention relates to an improved process for effecting catalytic conversion of hydrocarbons in liquid phase with fluid catalyst. More particularly, this invention relates to isomerization of saturated hydrocarbons in liquid phase with a catalyst of the molten salt type, especially such as molten salt mixtures comprising metal salts of the Friedel-Crafts type catalyst.

The liquid phase isomerization of normal paraffin such as butane is well known and has been in commercial use for many years. This process is described, for example, in the "Oil and Gas Journal" No. 14, page 151, April 3, 1961. In brief, the isomerization process comprises passing a normal paraffin with dissolved hydrogen chloride at a slightly elevated temperature into a reactor where it is contacted with a molten salt mixture comprising aluminum chloride and antimony trichloride. After phase separation form the catalyst, usually within a section of the reactor itself, the reactor effluent containing isomerizate flows to a catalyst recovery column where separation of dissolved catalyst is effected by simple fractionation. The recovered catalyst is pumped from the catalyst recovery column back to the reactor. The isomerizate is taken overhead, condensed and then pumped to a hydrogen chloride stripper column wherein acid gas is removed and recycled to the reactor. The isomerizate, substantially free of hydrogen chloride and catalyst components, is generally given a caustic wash before ultimate use.

In the past, commercial isomerization has generally been limited to butane and, to a limited extent, pentane since the need heretofore, especially during times of war, has been for production of aviation gasoline. More recently, however, the demand for high octane motor gasoline has created a need for high-octane, low-boiling components such as isopentane and isohexane. Thus, recent emphasis has been on development of a practical process wherein normal pentane and heavier streams are isomerized to corresponding isomers for motor gasoline blending.

When isomerizing these heavier feeds, it is necessary to operate at higher reboil temperature in the catalyst recovery column in order to effect separation of the isomerizate from the catalyst component. When using hydrogen as a cracking suppressor, it is necessary to increase column pressure with a concomitant increase in reboil temperature, in order to condense the overhead material. This high reboil temperature presents certain operational problems. For example, the high reboil temperature causes (1) an increase in corrosion rate induced by the catalyst components, (2) decomposition of antimony trihalide, (3) an increase in undesirable sludge and polymer production and (4) more catalyst components going overhead with the isomerizate (the isomerizate can become even completely miscible with the catalyst).

There is for each column feed composition a column pressure-reboil temperature relationship necessary to effect separation of the isomerizate and lighter materials from the catalyst components and condense the overhead in essentially the liquid phase. When feed to a catalyst recovery column contains appreciable amounts of non-condensable gas such as hydrogen, methane and hydrogen halide, it is necessary to raise column pressure to condense a major portion of column overhead with the usual refinery cooling water. As column pressure increases, there is a concomitant increase in heat requirement as evidenced by a higher reboil temperature required to effect separation. Therefore, it is necessary, for example, to vent large amounts of non-condensable gas (generally from the catalyst recovery column accumulator) to either the atmosphere or refinery fuel in order to maintain a reboil temperature below 320° F. This non-condensable gas is generally a poor refinery fuel because of the hydrogen and acid gas present. By such venting, these vaulable gases are lost from the isomerization process.

In accordance with the preesnt invention, the composition of the feed to the catalyst recovery column is adjusted in a degasification zone. The conditions of this zone are controlled in a manner such that feed to the column contains from 0.7% m. to 9% m. non-condensable gas (hydrogen, hydrogen halide and methane). As a result of this degasification, separation of hydrocarbon from catalyst components is effected at reboil temperatures below approximately 320° F. but above the solidification temperature of the catalyst while overhead from the catalyst recovery column can be condensed with conventional refinery cooling water and recoverd in substantially a liquid phase. Corrosion of the reboil section and decomposition of antimony trihalide are substantially mitigated. Further advantages of the invention will be apparent to those skilled in the art from the following detailed description made with reference to the drawing, which is a flow diagram illustrating a preferred embodiment of the invention.

This invention is applicable to the isomerization of a hydrocarbon fraction containing $C_4$ and heavier normal paraffins and naphthenes, preferably a $C_5$ to $C_7$ saturate feed. In order to set forth more appropriately the nature of the invention without, however, intending to limit the scope thereof, it will be described in detail as applied to the liquid phase isomerization of a $C_5/C_6$ saturate fraction with an aluminum chloride-antimony trichloride molten salt catalyst.

Referring now to the drawing: the feed is introduced through line 14 and dried in dryer 16. With feeds which are substantially free from water, dryer 14 will of course be unnecessary and can be by-passed. Auxiliary equipment such as pumps, compressors, heat exchangers, control mechanisms, valves etc., which are obvious to those skilled in the art, are not shown. The dry feed passes through line 18 into the bottom of catalyst scrubber 20 and rises through the scrubber countercurrently to catalyst pumped from reactor 22 through line 24. The catalyst contains sludge, an aluminum chloride-hydrocarbon complex formed as a result of undesirable side reactions in the reactor. In scrubber 20, antimony trichloride and active aluminum chloride in the catalyst are dissolved in the feed. The sludge, which is insoluble in hydrocarbon, and other contaminants such as corrosion products are removed from the scrubbing zone through line 26. The feed, now containing dissolved catalyst components, is passed to reactor 22 via line 28 together with hydrogen and hydrogen chloride from line 30. The amount of hydrogen halide is generally from about 4% w. to about 10% w. It is desirable to introduce from about 1 to about 3% w. hydrogen to suppress cracking and other undesirable side reactions. However, there is still some cracking even when hydrogen is used. This results in the production of some light gases such as methane. The reactor can be suitably of the stirred type which has been widely used in commercial practice, but is preferably a vertical tower containing a pool of catalyst such as described in Thomas, U.S. Patent 2,983,775, issued May 9, 1961. The catalyst is a molten salt mixture of antimony trichloride and aluminum chloride in appropriate proportion of from about 84% to about 98% by weight antimony trichloride and from about 16% to about 2% by weight aluminum chloride.

Temperature in the reaction zone can range from a minimum temperature at which the catalyst can be maintained in the molten stage up to approximately 210° F. The isomerization can be carried out at higher temperatures, but the low temperatures result in a more desirable yield structure. The pressure in the reaction zone can vary from the pressure required to maintain the $C_5/C_6$ stream primarily in the liquid phase up to any desired super atmospheric pressure. Pressures from about 120 to about 500 pounds per square inch gauge generally are suitable.

The liquid reactor effluent enters degasification zone 32 through line 34 to effect separation into a gaseous phase which is compressed and recycled to reactor 22 through line 30, and a liquid phase which enters catalyst recovery column 36 through line 38. The catalyst recovery column is operated at super atmospheric pressure. Conditions of the degasification zone are controlled in a manner such that the liquid phase from this zone contains non-condensable gas (hydrogen, hydrogen halide and methane) within a specific concentration range.

The conditions in the degasification zone and the amount of non-condensable gas that can be tolerated in the liquid phase (feed to the catalyst recovery column) are dependent upon such variables as feed composition, isomerization conditions, the use of a promoter such as hydrogen halide, the use of a cracking suppressor such as hydrogen, the amount of cracking that takes place during the isomerization reaction, etc. For example, when typical feeds are isomerized in the presence of hydrogen halide and hydrogen, the conditions of the degasification zone are adjusted in order that the liquid phase from the zone contains the approximate concentration range of non-condensable gas set forth in Table I.

TABLE I

| Saturate feed: | Non-condensable gas, percent m. |
| --- | --- |
| $C_5$ fraction containing paraffins | 3.5–9 |
| $C_6$ fraction containing paraffins | 2.5–6 |
| $C_5/C_6$ fraction containing paraffins and naphthenes | 1.5–4.5 |
| $C_5/C_7$ fraction containing paraffins and naphthenes | 0.7–2.5 |

When the liquid phase contains too little noncondensable gas, the super-atmospheric catalyst recovery column pressure can be so low that the associated reboil temperature would be below the solidification temperature of the catalyst components. Moreover, if the degasification zone is operated in a manner such that the liquid phase contains an amount of noncondensable gas less than the above range, appreciable amounts of high octane isomers are remover in the gaseous phase. These isomers are compressed (resulting in increased compressor load and size) and recycled to the reactor wherein the isomer suppresses isomerization reaction and results in lower net conversion of the normal paraffins. As a result of the degasification, separation of hydrocarbon from catalyst components can be effected in the catalyst recovery column at a reboil temperature below about 320° F. and above the solidification temperature of the catalyst component while the column overhead can be condensed with 90° F. cooling water and recovered substantially in the liquid phase.

While it is not necessary in the practice of the invention, it is preferred that the pressure in the degasification zone be below reactor pressure but above the operating pressure of the catalyst recovery column in order that reactor effluent and feed to the catalyst recovery column can be pressured rather than pumped. For example, when isomerizing a $C_5/C_6$ saturate feed at 250 p.s.i.g. reactor pressure, the degasification zone can be operated at approximately 105 p.s.i.g. and the catalyst recovery column can be operated at an accumulator pressure of 30 p.s.i.g.

The minimum temperature in the degasification zone is that temperature at which the catalyst can be maintained in the molten state. In certain cases when operating at low isomerization temperatures, it is necessary to provide heat exchange in order to keep the bottom temperature of the gas separation zone above the solidification point of the molten salt catalyst. For example, the solidification point of an aluminum chloride-antimony trichloride molten salt catalyst consisting predominately of antimony trichloride is approximately 165° F.

The gaseous phase consists of hydrogen, hydrogen halide, hydrocarbon and vaporized catalyst components. In one embodiment of the invention, it is desirable to include a means for cooling the gases in order to minimize the amount of catalyst components and condensable hydrocarbon in this gaseous phase. For example, reflux can be used either as an external fraction which is introduced into the degasification zone through line 40 or generated by means of a cooler contained in the top of the zone which will condense the hydrocarbon and provide internal reflux. The reflux can be, for example, feed to the HCl stripping column or isomerizate product. It is preferred to use feed to the HCl stripping column in order to remove additional amounts of HCl overhead and reduce loadings on the stripper column. If desired, separation can genreally be improved by the use of fractionation trays and the like.

Separation of hydrocarbon from catalyst components is effected in catalyst recovery column 36. Isomerizate and ligher materials are distilled overhead through line 42, condensed and collector in accumulator 44. Recovered catalyst is recycled to isomerization reactor 22 through line 46. Fresh catalyst can be added to the system through line 48.

The condensed isomerizate and lighter materials pass from accumulator 44 through line 50 into HCl stripping column 52. A portion of this stream can be introduced into the degasification zone as reflux. Hydrogen chloride is recovered overhead via line 54, compressed and recycled to reactor 22. Hydrogen and hydrogen chloride can be added to the system as necessary. The isomerizate is recovered as a bottom product to line 56. It is desirable to give the isomerizate a light caustic treatment and water wash in vessel 58 to remove any residual HCl. By removing non-condesable gas before the catalyst recovery column and HCl stripping column, lower vapor loadings on these columns are realized; consequently, smaller columns can be installed with a reduction in capital costs. Moreover, when hydrogen and hydrogen chloride are removed in the degasification zone at substantially higher pressure than catalyst recovery column pressure, and hydrogen and hydrogen chloride from the degasification zone and hydrogen chloride from the HCl stripper can be recycled to the reactor through a common compressor. The HCl stripping column is operated at a pressure which is in balance with the pressure of the degasification zone. This operation has several advantages in itself. In the past, the HCl stripping column has been operated at pressures sufficiently greater than reactor pressure to permit the HCl to be pressured into the reactor. This resulted in a large stripping column and concomitant high-pressure equipment and further limited the height of the reactor because of the static pressure, in the reactor vessel, that the HCl would have to meet.

A comparison of prior practice and practice of the instant invention is made in Table II for the isomerization of a $C_5$ normal paraffin fraction.

TABLE II

*Operating pressures*

|  | Without Degasification Zone, p.s.i.g. | With Degasification Zone, p.s.i.g. |
|---|---|---|
| Degasification Zone | | 180 |
| Catalyst Recovery Column | 125 | 105 |
| HCl Stripping Column | 350 | 165 |
| Reactor | 300 | 300 |

The following example is illustrative of some of the advantages derived from the invention but is not to be considered to limit the scope of the invention.

EXAMPLE I

A $C_5$ saturate feed is isomerized using aluminum chloride catalyst in admixture with antimony trichloride at 200° F. recator temperature, 300 p.s.i.g. reactor pressure, 5% by weight hydrogen chloride as a promotor, and 2% m. hydrogen as a cracking inhibitor. The effluent from the isomerization reactor is routed through a control valve into a degasification zone. The zone is operated at about 180 p.s.i.g. and contains one chimney tray and one grid tray in the upper portion of the zone. HCl stripper feed at approximately 100° F. is introduced as reflux into the zone above the chimney tray in order to remove hydrocarbon and catalyst vapors from the gaseous phase. A gaseous stream containing hydrogen, hydrogen chloride and hydrocarbon is withdrawn from the zone at 160° F. A liquid stream containing approximately 5.1% m. non-condensable gas (hydrogen, hydrogen chloride, and methane) is withdrawn from the bottom of the degasification zone at approximately 185° F. and introduced into the catalyst recovery column. It is evident that there is substantially no cooling of the liquid phase in the degasification zone during separation of the gaseous stream from the liquid stream.

The catalyst recovery column is operated at approximately 105 p.s.i.g. with a reboiler temperature of approximately 260° F. The overhead from the catalyst recovery column is condensed with 100° F. refinery cooling water and collected in the catalyst recovery column overhead accumulator.

We claim as our invention:

1. In an isomerization process wherein a normal paraffin having from 5 to 7 carbon atoms is contacted in a reaction zone with a molten salt catalyst in the presence of hydrogen halide and hydrogen reactor effluent is withdrawn from the reaction zone and passed into a fractionation zone to effect separation of isomerizate, and hydrogen and hydrogen halide from catalyst components and the hydrogen halide is subsequently separated from the isomerizate in a hydrogen halide stripping column, the improvement which comprises introducing the reactor effluent into a degasification zone operated at a pressure intermediate of reaction zone pressure and fractionation zone pressure, withdrawing from the degasification zone a gaseous phase rich in hydrogen halide and hydrogen and a liquid phase containing from 0.7% m. to 9% m. non-condensable gas, passing the liquid phase to the fractionation zone, operated at a reboil temperature which is above solidification temperature of the catalyst but below 320° F., to effect separation of isomerizate and hydrogen halide from catalyst components and passing the isomerizate and hydrogen halide to the stripping column operated at substantially the same pressure as the degasification zone.

2. The process of claim 1 wherein the normal paraffin feed is a $C_5$ fraction and the liquid phase from the gasification zone contains 3.5–9% m. non-condensable gas.

3. The process of claim 1 wherein the normal paraffin feed is a $C_6$ fraction and the liquid phase from the gasification zone contains 2.5–6% m. non-condensable gas.

4. The process of claim 1 wherein the normal paraffin feed is a naphthene-containing $C_5$–$C_6$ fraction and the liquid phase from the gasification zone contains 1.5–4.5% m. non-condensable gas.

References Cited by the Examiner
UNITED STATES PATENTS

| 2,983,775 | 5/61 | Thomas | 260—683.75 |
| 3,097,155 | 7/63 | Friedman et al. | 260—683.48 X |

DELBERT E. GANTZ, *Primary Examiner.*

ALPHONSO D. SULLIVAN, *Examiner.*